Figure 1B:
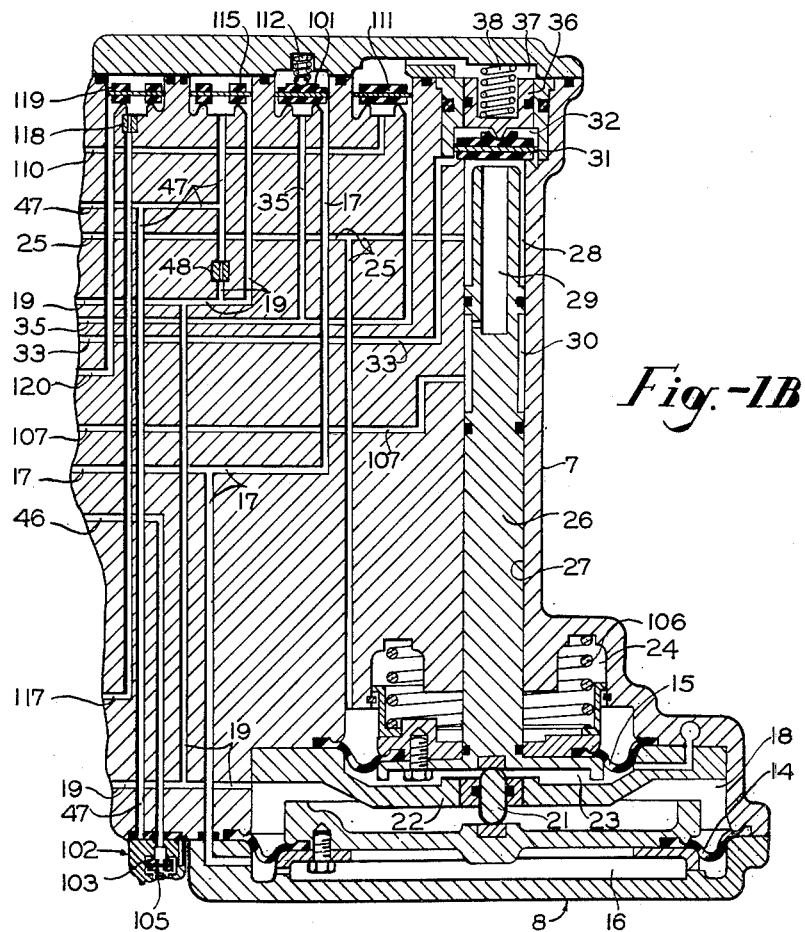

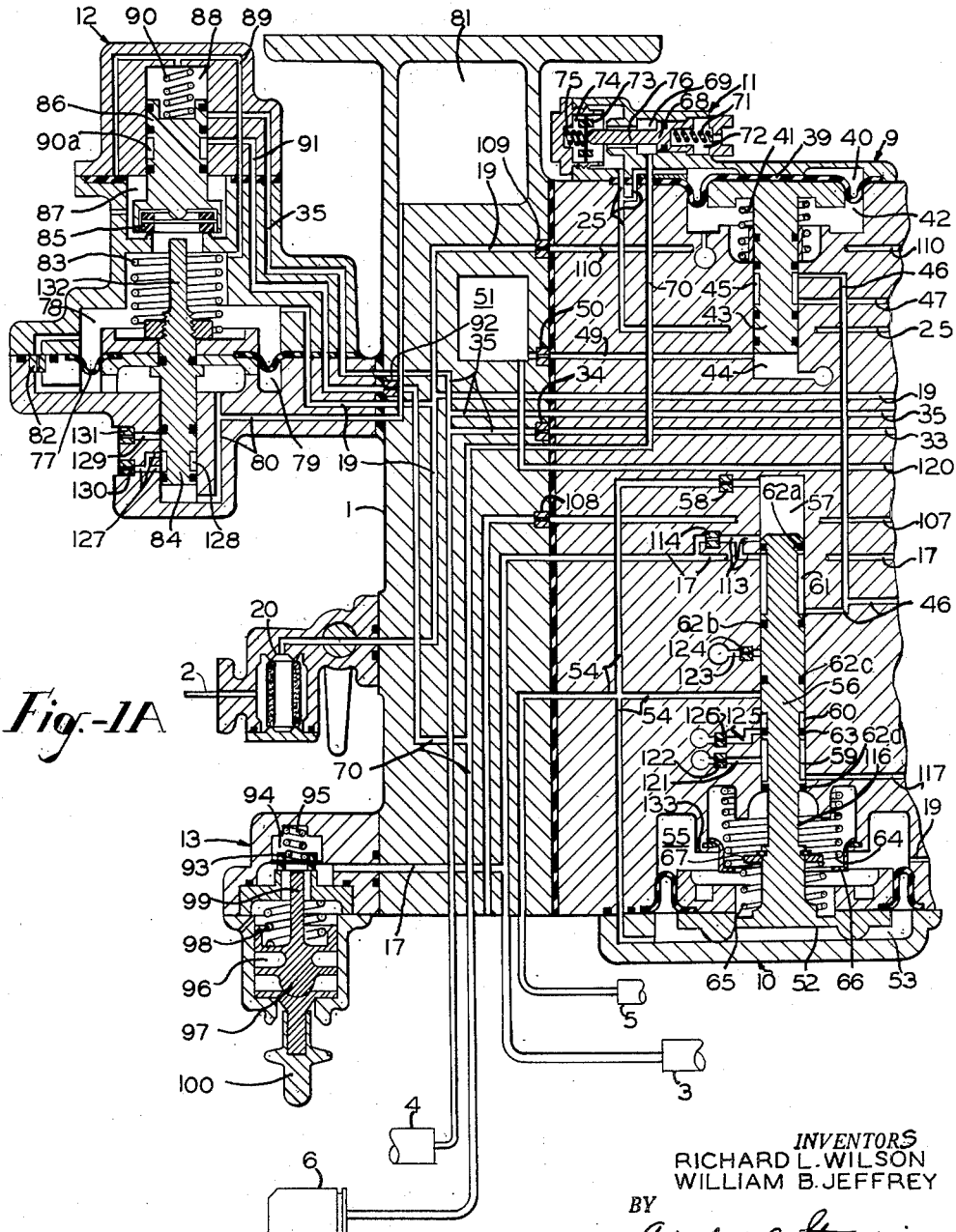

Jan. 23, 1962

R. L. WILSON ET AL 3,018,138

FLUID PRESSURE BRAKE APPARATUS HAVING
SELECTABLE GRADUATED AND DIRECT
RELEASE ARRANGEMENT

Filed Sept. 12, 1957

2 Sheets-Sheet 2

INVENTORS
RICHARD L. WILSON
WILLIAM B. JEFFREY
BY

ATTORNEY

United States Patent Office 3,018,138
Patented Jan. 23, 1962

3,018,138
FLUID PRESSURE BRAKE APPARATUS HAVING SELECTABLE GRADUATED AND DIRECT RELEASE ARRANGEMENT
Richard L. Wilson, Pittsburgh, and William B. Jeffrey, Irwin, Pa., assignors to Westinghouse Air Brake Company, Wilmerding, Pa., a corporation of Pennsylvania
Filed Sept. 12, 1957, Ser. No. 683,661
15 Claims. (Cl. 303—36)

This invention relates to fluid pressure brake apparatus of the type wherein the degree of application and release of brakes is controlled according to the extent of reduction and restoration, respectively, in pressure of fluid in a brake pipe relative to pressure of fluid in a control reservoir; this invention relating more particularly to means associated with said apparatus for selectably providing graduated or direct release of brakes on a railway car.

Apparatus of the above general type not provided with the aforementioned means operates to provide graduated release of brakes in an infinite number of steps or stages according to the extent of the operator-effected increase in brake pipe pressure at the locomotive. However, it is desirable that railway cars equipped with this apparatus be capable of use in mixed trains comprising railway cars equipped either with graduated release-type triple valves, such as the "D-22" (which can provide graduated release of brakes only in a relatively few steps or stages) or with direct release-type triple valves, such as the "AB" or "K" (which are incapable of providing graduated release and always effect a complete direct release upon a slight increase in brake pipe pressure).

It is therefore the principal object of this invention to provide an improved apparatus of the above general type embodying novel means whereby operation of such apparatus may be rendered compatible selectively with the "D-22" graduated release-type triple valve or with the "AB" and "K" direct release-type triple valves.

Another object is to provide an improved brake apparatus embodying novel means for desirably deferring a graduated or direct release of brakes following an emergency application of brakes so as to thereby maintain brakes applied until brake pipe pressure is restored to at least a minimum value.

Another object is to provide an improved apparatus of the above type embodying novel means for providing a local quick service reduction in brake pipe pressure, not only upon an initial operator-effected reduction in brake pipe pressure below normal charge value, but also upon subsequent successive further operator-effected reductions in brake pipe pressure, if any, for effecting brake applications of increased degree, so as to thereby, by what will hereinafter be referred to as "continuous quick service activity," desirably propagate a brake pipe pressure reduction wave rearward from car to car during such subsequent successive operator-effected reductions in brake pipe pressure.

According to these objects, the improved apparatus comprises a release selector means adjustable selectively to a direct release position and a graduated release position for respectively permitting and preventing flow of control reservoir flow into the brake pipe during a release of a service application and an emergency application of brakes. Also a novel combined quick service and selector valve means is provided which is controlled by brake pipe pressure opposing pressure of fluid in a selector volume normally open to the brake pipe and responds to an initial reduction in brake pipe pressure to cut off the brake pipe from the control reservoir and selector volume; said valve means being responsive to a service rate of reduction in brake pipe pressure to effect a local quick service reduction in brake pipe pressure and release fluid under pressure from the selector volume to substantially the reduced value of brake pipe pressure for conditioning said valve means to provide continuous quick service reductions in brake pipe pressure upon each and every operator-effected service reduction in brake pipe pressure following said initial reduction; said valve means being responsive to an emergency rate of brake pipe pressure reduction to bottle up fluid in the selector volume at substantially the value of brake pipe pressure existing at the time the emergency reduction was initiated; said valve means being responsive to a subsequent increase in brake pipe pressure above selector volume pressure to move to a normal position for effecting a slight reduction in control reservoir pressure solely by flow at a restricted rate to the selector volume to cause the apparatus to follow a graduated brake release pattern compatible with that of the "D-22" triple valve, provided the release selector means is then in its graduated release position; and said valve means being operative upon movement to its normal position, if the release selector means is then in its direct release position, to dump control reservoir fluid into the brake pipe at a faster rate for causing said apparatus to effect a complete direct release of brakes compatible with that of the "AB" and "K" triple valves. This combined valve means also cooperates with another valve means to serially control charging communications whereby the selector volume and control reservoir are charged from the brake pipe; said combined valve means being operative to initially close said charging communications upon movement out of normal position and said other valve means being operative to secondarily close said charging communications and maintain same closed until pressure of fluid in a brake cylinder has been reduced to below a chosen low value, despite intervening return of said combined valve means to its normal position in which it permits flow through said charging communications.

Figure 2:
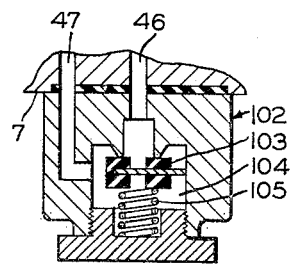

Other objects and advantages will become apparent from the following more detailed description of the invention and from the accompanying drawings, wherein: FIGS. 1A and 1B, when taken together, such that the right-hand edge of FIG. 1A is matched with the left-hand edge of FIG. 1B, constitute a diagrammatic view of a brake apparatus embodying the invention, with a release selector device in a graduated release position, and FIG. 2 is an enlarged fragmentary view of the release selector device of FIG. 1B, shown in a direct release position.

*Description*

As shown in FIGS. 1A and 1B of the drawings, the brake apparatus embodying the invention comprises a pipe bracket 1 to which are connected a branch of the usual brake pipe 2, a control reservoir 3, a supply reservoir 4, a selector volume reservoir 5, and a brake cylinder 6. Mounted on one face of the pipe bracket 1 is a sectionalized casing 7 containing a service valve device 8, a combined charging and quick service cut-off valve device 9, a combined quick service and selector valve device 10, and a brake cylinder limiting valve device 11. Also mounted on the pipe bracket 1 are an emergency valve device 12 and a reservoir release valve device 13.

The service valve device 8 preferably comprises two coaxially-arranged movable abutments 14, 15 of different effective areas cooperatively, though not positively, connected so as to constitute a stack, as will be understood from subsequent description. The larger movable abutment 14 has at one side a chamber 16 constantly open via a passage 17 to the control reservoir 3; and said movable abutment has at the opposite side a chamber 18 constantly open via a passage 19 and a brake pipe strainer 20 to the brake pipe 2. A cylindrical pusher stem 21 arranged coaxially with the movable abutments 14, 15 has sealing, slidably guided contact with the wall of an aligned bore through a casing partition 22 separating chamber 18 from an atmospheric chamber 23 at one side of movable abutment 15; the ends of said pusher stem abuttingly engaging the adjacent sides of said movable abutments. At the opposite side of movable abutment 15 is a chamber 24 constantly open to a passage 25 which is normally open to the brake cylinder 6 via the brake cylinder limiting valve device 11. Coaxially connected to the movable abutment 15 is a cylindrical service valve 26 having sealing, slidably guided contact with the wall of an aligned bore 27 open at one end to chamber 24 and open at the opposite end to a generally annular chamber 28 that surrounds a reduced diameter portion of said valve and is constantly open to a branch of passage 25. This reduced diameter portion has a central bore-like opening 29 that is constantly open via suitable radial ports to an elongated annular cavity 30 formed in the exterior of valve 26.

Arranged coaxially with valve 26 is a preferably disc-shaped brake cylinder supply valve 31 which controls communication between chamber 28 and a chamber 32 that is open via a passage 33, a brake cylinder service application choke 34, and a passage 35 to the supply reservoir 4. A loading piston 36 subject to opposing fluid pressures in chamber 32 and in a chamber 37 is urged, by a helical bias spring 38 in chamber 37, into abutting contact with the supply valve 31 for normally seating the latter against an annular valve seat rib encircling the inner end of bore 27.

The combined charging and quick service cut-off valve device 9 preferably comprises a movable abutment 39 subject to fluid pressure in a chamber 40 open to a branch of passage 25 opposing pressure of a helical bias spring 41 in an atmospheric chamber 42. Movable abutment 39 is coaxially connected to cylindrical charging and quick service cut-off valve 43 having sealing, slidably guided contact with the wall of an aligned bore open at one end to chamber 42 and at the opposite end to an atmospheric chamber 44. When pressure in chamber 40 is less than a preselected value, such as about 2 p.s.i., valve 43 will be biased by spring 41 to a charging position, in which it is shown. With valve 43 in this position, an elongated annular cavity 45 in the exterior of said valve connects a passage 46 with a passage 47 that is open via a control reservoir slow charge choke to a branch of brake pipe passage 19; and, according to a feature of the invention, a passage 49, that is open via a continued quick service reduction choke 50 to a quick service volume 51, is uncovered past the end of valve 43 to atmospheric chamber 44.

According to another feature of the invention, the combined quick service and selector valve device 10 preferably comprises a movable abutment 52 having at one side a chamber 53 open via a passage 54 to the selector volume reservoir 5 and having at the opposite side a chamber 55 open to a branch of brake pipe passage 19. Coaxially attached to movable abutment 52 is a cylindrical combined quick service and selector valve 56 having sealing, slidably guided contact with the wall of an aligned bore that is open at one end to chamber 55 and at the opposite end to a chamber 57 which, in turn, is open via a selector volume charging choke 58 to a branch of passage 54. Valve 56 has three spaced elongated annular cavities 59, 60, 61 and carries four O-ring seals 62a, 62b, 62c, 62d, for preventing leakage along the valve bore. O-ring 62a is interposed between chamber 57 and cavity 61; O-rings 62b and 62c are disposed in spaced relation between cavities 61 and 60; and O-ring 62d is interposed between cavity 59 and chamber 55. Another O-ring, 63, is reciprocable within and relative to the cavity 60 so as to serve as a check valve in the manner hereinafter to be described.

Two helical bias springs 64, 65 are arranged concentrically about the part of valve 56 that extends into chamber 55. One end of the outer spring 64 bears against the end wall of chamber 55 and the other end of said spring bears against an annular spring retainer 66 which is suitably retained by a retaining ring to limit the extent of expansion of said spring in the direction of chamber 53, so that it will be ineffective to exert a downward bias on the movable abutment 52 until the latter has moved upwardly a predetermined distance. One end of the inner spring 65 bears against the upper face of movable abutment 52 and the other end bears against a spring-retaining washer 67 that slidably encircles a part of valve 56 within chamber 55 and is suitably retained at its upper side by a retaining ring to limit the extent of expansion of spring 65 in the direction of chamber 57 so that said spring will be ineffective to exert a downward bias on movable abutment 52 until the latter has moved upwardly a predetermined greater distance.

Thus, when brake pipe pressure in chamber 55 initially exceeds (though it may later equal) selector volume pressure in chamber 53, the valve 56 will be biased to a normal position, in which it is shown, defined by contact of movable abutment 52 with the end wall of chamber 53; and in this position, springs 64 and 65 will not exert any downward bias on movable abutment 52, for reasons hereinafter to be explained.

The brake cylinder limiting valve device 11 preferably comprises a movable abutment 68 reciprocable within a bore and subject at one side to pressure of fluid in a chamber 69 that has unrestricted communication with the brake cylinder 6 via a passage 70 and is subject at the opposite side to pressure of a helical bias spring 71 in an atmospheric chamber 72. Arranged coaxially with movable abutment 68 is a poppet-type limiting valve 73 which is contained in a chamber 74 and is urged by a relatively light helical bias spring 75 in said chamber toward seating engagement with an annular valve seat rib encircling chamber 69, for preventing flow between the chambers 74 and 69. However, when brake cylinder pressure, as noted in chamber 69, is less than a preselected value, such as about 50 p.s.i. as determined by the bias effect of spring 71, the limiting valve 73 will be held unseated by the movable abutment 68 through the medium of a pusher stem 76 that projects with radial clearance through the aforementioned valve seat rib for thereby permitting flow between the passage 25 and the brake cylinder passage 70.

The emergency valve device 12 preferably comprises a movable abutment 77 having at one side a chamber 78 that is open to a branch of brake pipe passage 19 and having at the opposite side a chamber 79 that is connected via a passage 80 to a quick action chamber 81 that is charged from chamber 78 via a quick action chamber charging choke 82. When pressures in the chambers 78 and 79 are substantially equal, a helical bias spring 83 in chamber 78 biases movable abutment 77 into contact with a stop rim formed integrally with the end wall of chamber 79 for thereby defining a normal position of a cylindrical emergency valve 84 that is coaxially connected to said movable abutment and has slidably guided contact with the wall of an aligned bore open at one end to chamber 79 and open at the opposite end to chamber 79 via a branch of passage 80 so that quick action chamber pressure will be effective over the same area of movable abutment 77 as opposing brake pipe pressure.

Arranged coaxially with the movable abutment 77 is a preferably disc-shaped brake pipe vent valve 85, which abuts a cylindrical high pressure valve 86 having sealing, slidably guided contact with the wall of an aligned bore that is open at one end to an atmospheric chamber 87 and open at the opposite end to a chamber 88 having unrestricted communication with chamber 78 via a passage 89. A helical bias spring 90 in chamber 88 urges the high pressure valve 86 to a normal position, in which it is shown, and in which said valve through abutting contact with vent valve 85 operatively holds the latter seated against an annular valve seat rib encircling chamber 78. With vent valve 85 seated, fluid flow from the brake pipe chamber 78 to atmospheric chamber 87 is prevented; and with high pressure valve 86 in its normal position, a branch of supply reservoir passage 35 is lapped, and an elongated annular cavity 90a formed in valve 86 intermediate its ends is exposed solely to a passage 91 that is connected via a brake cylinder emergency application choke 92 to a branch of brake cylinder passage 70.

The reservoir release valve device 13 preferably comprises a disc-shaped poppet-type reservoir release valve 93 that is contained in a chamber 94 constantly open to a branch of control reservoir passage 17 and is normally held seated by a helical bias spring 95 in said chamber for preventing release flow of fluid under pressure from the control reservoir 3 past valve 93 to an atmospheric chamber 96. A plunger 97, arranged coaxially with and below the valve 93, is biased by a helical spring 98 in chamber 96 to a lower limit position, in which it is shown, and in which position a pusher stem 99 formed integrally with said plunger is disengaged from the release valve 93. The plunger 97 responds to rocking or tilting of an operating lever 100 to move upwardly and operatively unseat valve 93 through the medium of stem 99 for releasing fluid under pressure from the control reservoir 3. Whenever valve 93 is unseated to release fluid under pressure from the control reservoir 3 to the atmosphere, fluid under pressure will also be reduced at the same rate and to almost the same degree in the supply reservoir 4, by flow to atmosphere through a branch of supply reservoir passage 35 and past a spring-biased disc-shaped control reservoir fast charge check valve 101 to a branch of control reservoir passage 17, and thence past valve 93.

A release selector device 102, suitably attached to the casing 7, is adjustable to either a graduated release position (FIG. 1B) or to a direct release position (FIG. 2) according to the type of brake release desired. As best shown in FIG. 2, this device comprises a preferably disc-shaped check valve 103 contained in a chamber 104 and normally biased by a helical spring 105 in said chamber and pressure of fluid in said chamber to a seated position against the pressure of fluid in a branch of passage 46. Chamber 104 is connected to a branch of passage 47 or is disconnected therefrom according to whether the device 102 is in its direct release position or its graduated release position, respectively.

*Operation*

Assume initially that the apparatus is devoid of fluid under pressure. Under this condition, a helical bias spring 106 in chamber 24 will bias the service valve 26 of device 8 to a brake release position, in which it is shown, and in which the brake cylinder supply valve 31 is seated by spring 38, and the brake cylinder 6 is opened to the atmosphere by way of passage 70, chamber 69, unseated limiting valve 73, chamber 74, passage 25, chamber 28, opening 29 and cavity 30 of valve 26, and a brake cylinder exhaust passage 107 containing a brake cylinder exhaust choke 108. With the brake cylinder and hence chamber 40 of valve device 9 vented, valve 43 will be in its previously-defined charging position. The emergency valve 84 will be biased by spring 83 to its previously-defined normal position; and the brake pipe vent valve 85 will be seated and the high pressure valve 86 will be biased to its previously-defined normal position by spring 90. Thus, all of the valves will be in the respective positions in which they are shown in the FIGS. 1A and 1B of the drawings, with the possible exception of the combined quick service and selector valve 56 and release selector device 102.

*Initial charging*

To initially charge the apparatus, fluid under pressure is supplied to the brake pipe 2 at the locomotive in the well-known manner. On a particular car, some of the fluid thus supplied to the brake pipe will flow via strainer 20 and brake pipe passage 19 to chamber 55 of valve device 10 for promptly biasing the combined quick service and selector valve 56 to its normal position, in which it is shown, if it is not already there.

Fluid under pressure will also flow via a branch of brake pipe passage 19, a supply reservoir fast charge choke 109, and a passage 110 to the underside of a preferably disc-shaped supply reservoir charging check valve 111, and then unseat and flow past said check valve and through a branch of supply reservoir passage 35 to the supply reservoir 4, for charging the supply reservoir at a relatively fast rate. Some of this fluid will flow via another branch of passage 35 to the underside of the control reservoir fast charge check valve 101 and unseat the latter against the relatively light resistance of a helical bias spring 112, and then flow past said check valve to a branch of control reservoir passage 17 for charging the control reservoir 3 and chamber 16 of service valve device 8 at a relatively fast rate until control reservoir pressure is a preselected degree, such as about 2 p.s.i., below brake pipe pressure, as determined by the bias effect of spring 112. Meanwhile, chamber 18 of device 8 will be charged via brake pipe passage 19 at a substantially unrestricted, and hence faster, rate than chamber 16, with the result that service valve 26 will remain in brake release position throughout initial charging.

Meanwhile, some fluid will flow via brake pipe passage 19, control reservoir slow charge choke 48, passage 47, cavity 45 of valve 43 in charging position, passage 46, and cavity 61 of the combined quick service and selector valve 56 in normal position, to a passage 113. Fluid will then flow via one branch of passage 113 and through a control reservoir overcharge dissipation choke 114 to control reservoir passage 17 for permitting control reservoir pressure to equalize with brake pipe pressure at a relatively slow rate after closure of the fast charge check valve 112; and fluid will also flow via another branch of passage 113 and past the end of valve 56 to chamber 57 for charging the selector volume 5 to equality with brake pipe pressure at the rate controlled by charging choke 58.

Meanwhile, fluid under pressure will also flow at a substantially unrestricted rate from a branch of brake pipe passage 19 to chamber 78, whence it will flow via passage 89 to chamber 88 and also flow at the rate controlled by quick action chamber charging choke 82 to chamber 79 and to the quick action chamber 81, for charging said chambers to equality with brake pipe pressure.

If, during initial charging, the control reservoir 3 on a car near the head of train should temporarily become charged above the normal charge value of brake pipe pressure, this overcharge may be dissipated during the final phase of initial charging by flow of fluid under pressure from the control reservoir back into the brake pipe through the overcharge dissipation choke 114, passage 113, cavity 61, passage 46, cavity 45 and a branch of passage 47 to the underside of a control reservoir overcharge dissipation check valve 115, and, by unseating said check valve, flow therepast into a branch of brake pipe passage 19 in bypass of the control reservoir slow charge choke 48 and at a relatively rapid rate as controlled solely by choke 114.

Thus, at the completion of initial charging, all of the components will be in the respective positions in which they are shown in FIGS. 1A and 1B of the drawings, with the possible exception of the release selector device 102 which may have been previously adjusted to its direct release position (FIG. 2).

*Service application of brakes*

To effect a service application of brakes, brake pipe pressure is reduced at the locomotive in the well-known manner. When, on a particular car, brake pipe pressure has been reduced a slight degree, such as about .6 p.s.i., in passage 19 and hence in chamber 55 of device 10, the movable abutment 52 will be moved upwardly by preponderant selector volume pressure in chamber 53 for shifting valve 56 to a preliminary quick service position, defined by contact of said movable abutment with the spring retainer 66 without effecting compression of spring 64; it is to be noted that such movement will be very prompt because no resistance will be offered by the springs 64, 65, and only O-ring friction need be overcome.

With valve 56 in this position, passage 46 will be cut off from passage 113 for thereby closing the "control reservoir slow charge communication" 19, 48, 47, 45, 46, 61, 113, 114, 17 and also closing the "selector volume reservoir charging communication" 19, 48, 47, 45, 46, 61, 113, 57, 58, 54; passage 113 will be cut off from chamber 57 for disconnecting the control reservoir 3 from the selector volume reservoir 5; and a reduced diameter portion 116 of valve 56 will uncover chamber 55 to a passage 117 for causing fluid under pressure to flow from the brake pipe via passage 117 and a quick service reduction choke 118 to the underside of a quick service backflow check valve 119, and then unseat and flow past said check valve and through a passage 120 to the vented quick service volume 51 for effecting a rapid preliminary quick service reduction in brake pipe pressure of a chosen degree. When the quick service volume 51 is charged, fluid will continue to be released from the brake pipe at a slower rate via said quick service volume, the continued quick service reduction choke 50 and the passage 49 which is then uncovered to atmospheric chamber 44 by valve 43 in charging position.

As brake pipe pressure is thus further reduced below selector volume pressure (which is then at substantially the normal charge value of brake pipe pressure), the movable abutment 52 will be moved upwardly against resistance of spring 64, for thereby shifting valve 56 to a service position, defined by contact of spring-retaining washer 67 with the end wall of chamber 55, without effecting compression of spring 65. This movement of valve 56 to service position will be in three successive but uninterrupted phases. During the initial phase, portion 116 of valve 56 will uncover chamber 55 directly to an atmospheric vent port 121 containing a continuous quick service choke 122, for effecting a further degree of quick service reduction in brake pipe pressure. During the second phase, O-ring 62c will be carried upward past a very restricted vent port 123 containing a choke 124, for thereby connecting the part of cavity 60 above O-ring check valve 63 to atmosphere along the valve bore; since this check valve will then be in the lowermost part of cavity 60, as shown, there may be a momentary release of fluid under pressure from the selector volume passage 54 via cavity 60 and vent port 123, but any such blowdown of selector volume pressure will be insignificant due to the very restricted capacity of choke 124 and the rapid movement of valve 56 through this phase. During the third and final phase, the O-ring check valve 63 will be carried almost past passage 54, whereupon with the upper side of said check valve then connected to atmosphere, selector volume pressure will positively blow said O-ring check valve upwardly within cavity 60 into sealing contact with the upper end of said cavity for preventing leakage of selector volume pressure to atmosphere via port 123 and permitting fluid under pressure to be released from the selector volume reservoir 5 via passage 54, cavities 60 and 59, and a vent port 125 at the rate controlled by a choke 126 in said vent port 125. Due to the sequence of these phases, connection of the brake pipe to atmosphere via choke 122 is assured before the selector volume passage 54 is connected to atmosphere via choke 126, for thereby protecting against the possibility of a premature termination of quick service activity.

Meanwhile, as brake pipe pressure is reduced, aided by local quick service venting of the brake pipe by flow to the quick service volume 51 and to atmosphere via the chokes 50 and 122, brake pipe pressure in chamber 18 of service valve device 8 will be correspondingly reduced. This will cause the movable abutment 14 to be moved against resistance of springs 106 and 38 and thus carry the service valve 26 to a brake application position, during which movement said valve successively sealingly abuts valve 31 for sealing off opening 29 from chamber 28 and then unseats valve 31 for permitting fluid under pressure to flow from the supply reservoir 4 to the brake cylinder 6 via passage 35, service application choke 34, passage 33, unseated valve 31, chamber 28, passage 25, unseated limiting valve 73 and brake cylinder passage 70. Such flow to the brake cylinder will continue until brake cylinder pressure in chamber 24 has increased sufficiently to cause the movable abutment stack 14, 15 to move downwardly and thereby carry service valve 26 to a lap position, in which it sealingly abuts but does not unseat the supply valve 31 for thereby bottling up fluid in the brake cylinder at a pressure corresponding to the extent of reduction in brake pipe pressure. The effective area of movable abutment 14 is preferably about 2.9 times that of movable abutment 15 so that, after the initial bias of the springs 106 and 38 has been overcome, each 1 p.s.i. increment of change in brake pipe pressure will effect a corresponding 2.9 p.s.i. increment of change in brake cylinder pressure. The function of the loading piston 36 is to make supply valve 31 a substantially balanced valve for the reasons, and in the manner, fully described in the copending application of G. T. McClure, U.S. Serial No. 607,340, filed August 31, 1956, now Patent No. 2,926,967, issued March 1, 1960, but not here described in detail because not pertinent to the present invention.

Meanwhile, when brake cylinder pressure as noted via passage 25 in chamber 40 of valve device 9 exceeds the aforementioned 2 p.s.i., valve 43 will be operatively shifted to a cut-off position, in which the passages 47 and 46 are disconnected for secondarily closing the previously defined "control reservoir slow charge communication" and "selector volume reservoir charging communication" and the quick service volume 51 is cut off from atmospheric chamber 44 for terminating continued quick service activity and causing check valve 119 to bottle up fluid under pressure in the quick service volume 51, despite any subsequent reduction in brake pipe pressure via choke 122 and/or the brake pipe 2.

It is to be noted that the flow capacity of choke 126 is greater than the combined flow capacities of the brake pipe quick service chokes 122 and 50 via which fluid under pressure is then being locally vented from the brake pipe, so that selector volume pressure will blow down at a faster rate than brake pipe pressure is being reduced via said chokes 122, 50; and hence when selector volume pressure has been reduced to substantially the same degree as brake pipe pressure (after lapping of the brake pipe at the locomotive), the movable abutment 52 will be moved downwardly by brake pipe pressure and the pressure of spring 64 against opposition of reduced selector volume pressure for thereby shifting valve 56 back to its preliminary quick service position, in which fluid will be bottled up in the selector volume reservoir 5 at a pressure slightly above brake pipe pressure because of the bias effect of spring 64, and the brake pipe will be cut off from the continuous quick service choke 122 but connected to the underside of check valve 119. Since, by this time, the charging valve 43 will have operated to disconnect the quick service volume 51 from atmosphere, all quick service activity will terminate as soon as valve 56 returns to preliminary quick service position.

It is to be noted that before valve 56 is returned to this position, O-ring check valve 63 will be at the upper end of cavity 60 and thus be above the mouth of passage 54 so that selector volume pressure can continue to blow down, in bypass of valve 63, via the cavities 60, 59 and vent port 125. As the valve 56 attains its preliminary quick service position, the center of O-ring check valve 63 will be carried below the mouth of passage 54 and cause selector volume pressure in passage 54 to blow the valve 63 down into sealing contact with the lower end of cavity 60 (against atmospheric pressure in cavity 59) for thus bottling up fluid under pressure in the selector volume reservoir 5, as above stated. Thus, upon completion of the downward movement of valve 56 to preliminary quick service position the valve 63 and cavities and O-rings of valve 56 will be in the same respective positions as they assumed during completion of the upward movement of valve 56 to preliminary quick service position.

It will thus be noted that valve 63 is movable relative to and has a lost motion connection with the main valve 56, for providing a graduating function in much the same manner as would an auxiliary slide valve that is movable relative to and has a lost motion connection with a main slide valve. It will also be apparent from preceding description that valve 63 will successively be moved upward with and then upward relative to the valve 56 as the valve 56 moves to service position, for assuring that chamber 55 and hence the brake pipe will be uncovered via portion 116 to the vent choke 122 before the selector volume passage 54 is connected to vent choke 126; whereas when the valve 56 moves back toward preliminary quick service position, valve 63 will successively be moved downward with and then downward relative to the valve 56 for thereby assuring that the chamber 55 and hence the brake pipe will be cut off from vent choke 122 before the selector volume passage 54 is cut off from its vent choke 126. This arrangement will thus positively insure against the movable abutment 52 and valve 56 "hanging up" in an intermediate position between its service and preliminary quick service positions and in which release flow of selector volume air is partially throttled to an extent where fluid under pressure will continually be locally released at identical rates from both the brake pipe and selector volume reservoir 5 and thus prevent return of the valve 56 to preliminary quick service position.

Meanwhile, as brake pipe pressure is reduced in chamber 78 of emergency valve device 12, quick action chamber pressure in chamber 79 will shift the movable abutment 77 upward against resistance of spring 83 for thereby shifting emergency valve 84 to a service or breathing position, in which one branch of a vent port 127 is uncovered to the quick action chamber 81 past the end of valve 84 and another branch of said vent port is connected via an elongated annular cavity 128 in said valve to a vent port 129; vent ports 127, 129 having chokes 130, 131 respectively. Hence, quick action chamber pressure will blow down to atmosphere at the relatively fast rate determined by the combined flow capacities of the then parallel connected chokes 130, 131 for thereby assuring that the pressure differential across movable abutment 77 will not become sufficient to cause the vent valve 85 to be operatively unseated against the pressure of spring 90 by a pusher stem 132 coaxially connected to said movable abutment.

Thus, when a service application of brakes is effected, selector volume pressure and quick action chamber pressure will be reduced to substantially the same value as brake pipe pressure; brakes will be applied to a degree corresponding to the degree of reduction in brake pipe pressure relative to the pressure in the control reservoir which is then bottled up at the normal charge value of brake pipe pressure; and the control reservoir 3 will be disconnected from the selector volume reservoir 5 and the brake pipe.

*Continuous quick service feature*

If, while brakes are applied to a chosen degree, the operator reduces brake pipe pressure at the locomotive for effecting an increased degree of service application, the valve 56 of device 10 will be shifted from its preliminary quick service position to its service position for effecting a local quick service reduction in brake pipe pressure by connecting chamber 55 to atmosphere via the continuous quick service choke 122 and permitting selector volume pressure to blow down to substantially the same degree as brake pipe pressure is reduced, as will be understood from previous description; whereupon the valve 56 will return to its preliminary quick service position.

It will thus be noted that if brake pipe pressure is reduced in successive steps or stages, a limited degree of quick service reduction in brake pipe pressure will be effected when each step is initiated and not (as in arrangements heretofore proposed) solely upon initiation of the first step of brake pipe pressure reduction. Hence, this continuous quick service activity will desirably increase the rate at which a brake pipe pressure reduction wave is propagated through the train upon each successive step of brake pipe pressure reduction. As herein used, "continuous quick service activity" refers to quick service activity during each successive step of increase of the degree of brake application as controlled by choke 122; whereas "continued quick service activity" refers to the final stage of preliminary quick service activity which occurs only during the initial step of brake pipe pressure reduction and follows equalization of brake pipe pressure into quick service volume 51 and continues at the rate controlled by choke 50 until the latter is cut off from atmospheric chamber 44 by valve 43.

*Direct and graduated release of a service application of brakes*

When brake pipe pressure is increased at the locomotive for initiating a release of a service application of brakes, the valve 56 will be promptly shifted to its normal or release position, in which it is shown, inasmuch as brake pipe pressure in chamber 55 will quickly exceed selector volume pressure, which had previously been bottled up at a pressure very slightly in excess of brake pipe pressure, as determined by the light bias of spring 64.

Assuming that the release selector device 102 was preset in its direct release position (FIG. 2), then when valve 56 is moved to normal position, control reservoir fluid will flow via dissipation choke 114, passage 113, valve cavity 61 to passage 46, and then unseat and flow past check valve 103 of said device into passage 47, and then unseat and flow past the control reservoir dissipation check valve 115 into brake pipe passage 19 for causing control reservoir pressure to equalize into the brake pipe. In view of the consequent increase in brake pipe pressure in chamber 18 of service valve device 8 and decrease in control reservoir pressure in chamber 16, brake cylinder pressure in chamber 24 and spring 106 will be effective to promptly move the stack 14, 15 downwardly and thereby shift service valve 26 to its brake release position, in which it is shown. Valve 26 will remain in this position for causing a complete direct release of brake cylinder pressure, irrespective of the rate and degree of rise in brake pipe pressure, because once control reservoir pressure has equalized into the brake pipe, control reservoir will be restored (as during initial charging) at a slower rate than brake pipe pressure is restored. Thus, when the device 102 is in its direct release position and a slight increase in brake pipe pressure is effected by the operator at the locomotive, brake pipe pressure will be locally increased on each car, and propagate a broke pipe pressure increase wave rearward through the train for assuring a quick and complete release of brakes throughout the train.

It should be noted that with valve 56 in normal position, some control reservoir pressure will tend to be dissipated into the selector volume reservoir 5 via choke 114, passage 113, chamber 57, and choke 58; however, the degree of such dissipation will be insignificant due to the restricted flow capacity of choke 58.

Assume now that the release selector device 102 was preset in its graduated release position (FIG. 1B), in which check valve 103 is cut off from passage 47. Under this condition, when valve 56 is moved to normal position, control reservoir fluid will flow via choke 114 and passage 113, past the end of valve 56, to chamber 57 and thence via, and at the restricted rate controlled by, choke 58 to the selector volume reservoir passage 54 whence it will flow to reservoir 5 and to chamber 53 of device 10. This flow of control reservoir fluid to the chamber 53 will continue until selector volume pressure has increased slightly above brake pipe pressure as increased by the operator at the locomotive, whereupon the valve 56 will be shifted to its preliminary quick service position, in which the control reservoir will be cut off from the selector volume reservoir 5. It is to be noted that brake pipe pressure will rise at a more rapid rate than selector volume pressure because of the choke 58, and that the valve 56 will therefore not be moved to preliminary quick service position until after brake pipe pressure has been lapped at the locomotive, for thereby preventing undesired operation of valve 56 to service position which could occur if control reservoir pressure equalized too rapidly into the selector volume reservoir 5; it will also be noted that valve 43 will still be in its cut-off position, and hence no fluid can flow from the brake pipe past check valve 119 to the quick service volume 51.

This reduction in control reservoir pressure, by flow into the volume reservoir 5, will of course be noted in chamber 16 of service valve device 8 and help to cause the stack 14, 15 to shift service valve 26 to brake release position for releasing fluid under pressure from the brake cylinder 6 and from chamber 24. When brake cylinder pressure in chamber 24 has been reduced an extent corresponding to the degree of increase in brake pipe pressure in chamber 18 and degree of reduction in control reservoir pressure in chamber 16, the stack will become slightly unbalanced in an upward direction and shift valve 26 to its lap position for bottling up fluid in the brake cylinder at a corresponding reduced pressure.

It should be noted that the volume of the control reservoir 3 is preferably about twice that of the selector volume reservoir 5 so that the brake cylinder release pattern obtained as a result of an increasing brake pipe pressure and decreasing control reservoir pressure during a graduated release of brakes conforms substantially to that of the "D-22" control valve, made and sold by the assignee of the present invention and currently in widespread commercial use. According to this brake cylinder release pattern, brake cylinder pressure may be graduated off in only about five or six steps or stages from a full service application. In view of the ratio of 2.9 to 1 between the effective areas of the movable abutments 14 and 15 of the service valve device 8, it will be seen that a 1 p.s.i. change in either control reservoir pressure or brake pipe pressure will produce a 2.9 p.s.i. change in brake cylinder pressure, and that the extent of reduction in control reservoir pressure during a graduated release must therefore be very limited.

*Emergency application of brakes*

When brake pipe pressure is reduced at an emergency rate at the locomotive for initiating an emergency application of brakes, movable abutment 77 of emergency valve device 12 will be shifted upwardly by quick action chamber pressure in chamber 79 against resistance of reduced brake pipe pressure in chamber 78 and the pressure of spring 83 for thereby shifting emergency valve 84 initially to its previously-defined service position. Since the emergency rate of brake pipe pressure drop in chamber 78 will exceed the service rate at which quick action chamber pressure can be dissipated via breather chokes 130 and 131, the movable abutment 77 will continue upwardly and operatively, through the medium of pusher stem 132 and against resistance of spring 90, unseat the brake pipe vent valve 85 for locally venting the brake pipe at an emergency rate into atmospheric chamber 87 and, through the medium of valve 85, shift high pressure valve 86 to an emergency position in which valve cavity 90a connects supply reservoir passage 35 to passage 91 for permitting supply reservoir fluid to flow, in by-pass of limiting valve 73, via passage 91 and at the rate controlled by emergency application choke 92 to the brake cylinder 6 to effect an emergency application of brakes of a degree corresponding to equalization of supply reservoir pressure into the brake cylinder. With movable abutment 77 in emergency position, the O-ring below cavity 128 will be positioned between vent ports 127, 129 for causing quick action chamber pressure to blow down at a lesser rate than in service position, said lesser rate corresponding to the flow capacity solely of choke 130; this will positively assure that the vent valve 85 will be maintained open for a period of time determined by the flow rate through choke 130.

Meanwhile, as brake pipe pressure is rapidly reduced in chamber 55 of device 10, movable abutment 52 will be promptly moved against resistance of both springs 64 and 65 and thereby shift valve 56 upward through its previously-defined preliminary quick service position and service position to an emergency position, defined by contact of said movable abutment with an annular stop rib 133 encircling the end wall of chamber 55. With valve 56 in emergency position, O-ring 62d will be disposed between passage 54 and vent port 125, and O-ring check valve 63 will be at the upper end of cavity 60 but just below vent port 123, with the result that selector volume pressure will tend to force O-ring 62d and valve 63 in opposite directions and seal off the selector volume reservoir 5 from atmosphere. Thus, fluid in the selector volume reservoir 5 will be bottled up at substantially the pressure existing at the time the emergency application was initiated; it being noted that an emergency application may be initiated on top of, as well as instead of, a service application. Also, with valve 56 in emergency position, the control reservoir 3 and selector volume reservoir 5 will be isolated from each other and from the passage 46; and the brake pipe will be locally opened to atmosphere via chamber 55, portion 116 of valve 56, and the then parallel connected chokes 122, 126.

Meanwhile, as brake pipe pressure is reduced in chamber 18 of service valve device 8, the service valve 26 will be shifted to its previously-defined brake application position. Thus, flow to the brake cylinder from the supply reservoir 4 will be initially at a rate determined by the combined flow capacities of the emergency application choke 92 and service application choke 34; but as soon as brake cylinder pressure attains the aforementioned value of 50 p.s.i., this pressure acting on movable abutment 68 of device 11 will compress spring 71 and cause the brake cylinder limiting valve 73 to be seated by spring 75 for thereby cutting off the flow of supply reservoir air to the brake cylinder via the service valve 26 and passage 25, with the result that fluid will be bottled up in chamber 24 at a pressure of 50 p.s.i.

The charging valve 43 will of course be promptly closed when brake cylinder pressure exceeds 2 p.s.i. for cutting off the quick service volume 51 from atmosphere and secondarily closing the previously-defined "control reservoir slow charge communication," as described in connection with a service application.

During an emergency application, the brake pipe 2 will be completely vented. After supply reservoir pressure has equalized into the brake cylinder 6 via the high pressure valve 86, fluid in the quick action chamber 81 will blow down to atmosphere via choke 130; whereupon the emergency valve 84 will be shifted by pressure of spring 83 to its normal position, in which the quick action chamber is cut off from atmosphere; and spring 90 will then shift high pressure valve 86 to its normal position, in which it is shown, for closing off the auxiliary reservoir passage 35 from passage 91 leading to the brake cylinder 6 and also reseating vent valve 85.

*Direct and graduated release of an emergency application of brakes*

When brake pipe pressure is increased at the locomotive for causing a release of brakes, the emergency valve 84 will remain in its previously-defined normal position because brake pipe pressure in chamber 78 will increase faster than quick action chamber pressure in chamber 79. When brake pipe pressure in chamber 55 of device 10 has increased to within about 20 p.s.i. of the pressure of fluid then bottled up in the selector volume reservoir 5, movable abutment 52 will be moved downwardly by pressure of heavy spring 65 for thereby shifting valve 56 to its service position, where it will temporarily halt due to the caging of spring 65 by the retained washer 67. When valve 56 attains its service position, selector volume pressure will start to blow down to atmosphere via passage 54, cavities 60 and 59, and vent port 125 at the relatively fast rate controlled by choke 126; and, since brake pipe pressure is then increasing, valve 56 will be moved downward through its preliminary quick service position to its normal position when increasing brake pipe pressure exceeds reducing selector volume pressure.

Thereafter control reservoir fluid will flow to the brake pipe or to the selector volume reservoir 5 according to whether the release selector device 102 is preset for direct release (FIG. 2) or graduated release (FIG. 1B), for thereby causing the service valve device 8 to operate to provide a quick complete direct release of brakes or a graduated release of brakes of a degree corresponding substantially to the degree of operator-effected increase in brake pipe pressure.

It will thus be noted that following an emergency application of brakes, release of brake cylinder pressure will not commence until brake pipe pressure has been restored to at least a chosen minimum value. If we assume that the brake pipe is normally charged to 70 p.s.i., and further assume that an emergency application was made on top of a full service application (which had been effected by a service rate of reduction in brake pipe pressure to, say, 50 p.s.i.), then selector volume pressure will have been bottled up at substantially 50 p.s.i. (the value of brake pipe pressure at the time the emergency application was initiated). Under these assumed conditions, brake pipe pressure will have to be restored to a pressure within 20 p.s.i. (due to the bias effect of spring 65) of selector volume pressure, and hence to at least 30 p.s.i. before the valve 56 will be moved to service position. If the emergency application had been made when the brakes were released, then brake pipe pressure would have to be restored to within 20 p.s.i. of 70 p.s.i., namely to at least 50 p.s.i., before valve 56 will move to service position. This delay of the release of an emergency application is a desirable safety feature, which assures that a brake release (either direct or graduated) will not be initiated until brake pipe pressure has been restored to at least a chosen minimum value.

Upon recharging of the brake pipe following either a service application or an emergency application, the supply reservoir 4, control reservoir 3 and selector volume reservoir 5 will be recharged to equality with brake pipe pressure, in the manner described in connection with initial charging. It is to be noted, however, that the "control reservoir slow charge communication" 19, 48, 47, 45, 46, 61, 113, 114, 17 and the "selector volume charging communication" 19, 48, 47, 45, 46, 61, 113, 57, 58, 54 will not be reopened until brake cylinder pressure, as noted in chamber 40 of device 9, has been reduced below the illustrative 2 p.s.i. and caused valve 43 to be shifted to its charging position by spring 41.

Having now described the invention, what we claim as new and desire to secure by Letters Patent is:

1. In a fluid pressure brake apparatus, the combination of a brake pipe, a selector volume, and valve means forming part of and controlling a charging communication through which fluid under pressure may normally flow from the brake pipe to the selector volume and also forming part of and controlling two release communications of different flow capacities via which fluid under pressure may be released respectively from the brake pipe at a relatively slow rate and from the selector volume at a faster rate, said valve means being subject opposingly to brake pipe pressure and selector volume pressure and responsive to an initial operator-effected reduction in brake pipe pressure at a service rate below selector volume pressure to close said charging communication and open said release communications, said valve means being responsive to a consequent reduction in selector volume pressure to substantially the existing value of brake pipe pressure to close said release communications to terminate such release of fluid under pressure from the brake pipe and selector volume while continuing to maintain said charging communication closed for thereby conditioning said valve means to effect further local releases of brake pipe pressure upon successive further operator-effected reductions in brake pipe pressure, said valve means being responsive to an increase in brake pipe pressure above selector volume pressure to move to a normal position for permitting flow through said charging communication, said valve means being responsive to an emergency rate of reduction in brake pipe pressure relative to selector volume pressure to bottle up fluid in said selector volume at substantially the value of brake pipe pressure existing at the time said emergency reduction in brake pipe pressure was initiated for thereby deferring return of said valve means to normal position following an emergency rate of reduction in brake pipe pressure until brake pipe pressure has been restored to a value exceeding the value of selector volume pressure.

2. In a fluid pressure brake apparatus, the combination of a brake pipe, a selector volume, caged resilient means, and valve means forming part of and controlling two release communications of different flow capacities, via which fluid under pressure may be released respectively from the brake pipe at a relatively slow rate and from the selector volume at a faster rate, said valve means being controlled by selector volume pressure acting in opposition to brake pipe pressure and after a predetermined movement to the pressure of said caged resilient means, said valve means having a normal position for permitting restricted flow of fluid under pressure from the brake pipe to the selector volume and being responsive to an initial slight reduction in brake pipe pressure at a service rate below selector volume pressure to successively move to another position solely by virtue of the preponderance of selector volume pressure over brake pipe pressure and without opposition from said caged resilient means for cutting off the brake pipe from said selector volume and then move to a service position against resistance of said caged resilient means for opening said release communications, said valve means being responsive to a consequent reduction in selector volume pressure to substantially the reduced value of brake pipe pressure to move to its other position under action of said caged resilient means to close said release communications for terminating the local release of fluid under pressure from the brake pipe and selector volume while continuing to maintain the brake pipe cut off from the selector volume, said valve means being responsive to successive subsequent reductions in brake pipe pressure at a service rate following said initial reduction to move to service position and then said other position for repeatedly reopening said release communications and thereby effecting corresponding successive local releases of fluid under pressure from the brake pipe and selector volume, said valve means being responsive to an increase in brake pipe pressure above selector volume pressure to return to its normal position.

3. The combination according to claim 2, including second caged resilient means offering greater resistance than the first-named caged resilient means, said valve means being responsive to a reduction in brake pipe pressure at an emergency rate relative to selector volume pressure to move against the combined resistance of said first-named and said second caged resilient means to an emergency position in which brake pipe pressure is locally reduced via one of said release communications and the other of said release communications is closed to bottle up fluid in the selector volume at substantially the value of brake pipe pressure at the time the emergency reduction in brake pipe pressure was initiated for thereby deferring the return of said valve means to its normal position upon an increase in brake pipe pressure following an emergency reduction in brake pipe pressure.

4. A fluid pressure brake apparatus comprising, in combination, a brake pipe; a control reservoir; a selector volume; valve means forming part of and controlling two release communications of different flow capacities, a first charging communication via which fluid under pressure may normally flow from the brake pipe to the control reservoir, and a second charging communication via which fluid under pressure may normally flow from the brake pipe to the selector volume, said valve means being subject opposingly to brake pipe pressure and selector volume pressure and responsive to an initial reduction in brake pipe pressure at a service rate below selector volume pressure to close both of said charging communications and effect a local quick service release of fluid under pressure from the brake pipe via one of said release communications and also release fluid under pressure from the selector volume at a faster rate via the other of said release communications until selector volume pressure has been reduced to substantially the existing value of brake pipe pressure, said valve means being responsive to a reduction in brake pipe pressure at an emergency rate below selector volume pressure to close both of said charging communications and locally release fluid under pressure from the brake pipe via said one release communication and close said other release communication to bottle up fluid in the selector volume at substantially the value of brake pipe pressure as of the time the emergency rate of reduction in brake pipe pressure was initiated, said valve means being responsive to a subsequent increase in brake pipe pressure irrespective of rate above selector volume pressure to connect the control reservoir to the selector volume for effecting a slight reduction in control reservoir pressure; and service valve means for controlling the degree of application and release of brakes according to the extent of reduction and restoration, respectively, in brake pipe pressure relative to control reservoir pressure, whereby such connection of the control reservoir to the selector volume by said valve means for influencing operation of said service valve means will be deferred following an emergency rate of reduction in brake pipe pressure.

5. In a fluid pressure brake apparatus having a continuous quick service feature, the combination of a normally charged brake pipe in which pressure of fluid is reduced for causing a brake application, a selector volume normally open to the brake pipe, a normally closed preliminary quick service communication via which fluid under pressure may be locally released from the brake pipe, a normally closed continuous quick service communication via which fluid under pressure may be locally released from the brake pipe in bypass of the preliminary quick service communication, a normally closed release communication of greater flow capacity than said continuous quick service communication via which fluid under pressure may be released from said selector volume in bypass of the brake pipe, valve means interposed in and controlling each of the aforesaid communications and being subject opposingly to brake pipe pressure and selector volume pressure, said valve means being responsive to an initial reduction in brake pipe pressure at a service rate below selector volume pressure to successively assume one position for cutting off the selector volume from the brake pipe and opening said preliminary quick service communication and then assume a service position for opening said continuous quick service communication and opening said release communication, said valve means being returned to its said one position responsively to a consequent reduction in selector volume pressure to substantially the reduced value of brake pipe pressure for reclosing said continuous quick service communication and reclosing said release communication, said valve means being operative successively to its said service position and then its said one position responsively to successive reductions in brake pipe pressure at a service rate following said initial reduction, another communication to which fluid under pressure is supplied during a brake application and from which fluid under pressure is released during release of a brake application, and other valve means operative to close said preliminary quick service communication when and so long as pressure of fluid in said other communication exceeds a preselected low value such that said preliminary quick service communication will be closed during the initial reduction in brake pipe pressure prior to return of the first-named valve means to its said one position and remain closed so long as a brake application is in effect, whereby upon successive reductions in brake pipe pressure at a service rate following said initial reduction fluid under pressure will be locally released from the brake pipe solely by way of said continuous quick service communication.

6. In a fluid pressure brake apparatus, the combination of a brake pipe, a selector volume normally open to the brake pipe, a brake cylinder, a quick service volume other than the brake cylinder, a continuous quick service communication via which fluid under pressure may be locally released from the brake pipe in bypass of the quick service volume, a release communication of greater flow capacity than said continuous quick service communication via which fluid under pressure may be released from the selector volume, valve means forming part of the aforementioned communications and subject opposingly to brake pipe pressure and selector volume pressure, said valve means being responsive to an initial reduction in brake pipe pressure at a service rate below selector volume pressure to successively assume one position for cutting off the selector volume from the brake pipe and connecting the brake pipe to the quick service volume for causing a preliminary quick service reduction in brake pipe pressure and then in consequence of such quick service reduction assume a service position for opening said continuous quick service communication and said release communication, said valve means being returned to its said one position responsively to a consequent reduction in selector volume pressure to substantially the reduced value of brake pipe pressure for reclosing said continuous quick service communication and release communication, said valve means being operative successively to its said service position and then said one position responsively to successive further reductions in brake pipe pressure at a service rate following said initial reduction, other valve means operative to open the quick service volume to atmosphere or cut off the quick service volume from atmosphere according to whether brake cylinder pressure is less than or exceeds a preselected low value, and service valve means responsive to a service rate of reduction in brake pipe pressure to supply fluid under pressure to the brake cylinder, whereby upon successive reductions in brake pipe pressure following said initial reduction fluid under pressure will be locally released from the brake pipe solely by way of said continuous quick service communication.

7. In a fluid pressure brake apparatus, the combination of a normally charged brake pipe; a selector volume chargeable with fluid under pressure from the brake pipe at a restricted rate; casing means providing a passage open to the selector volume, a normally closed quick service communication via which fluid under pressure may be locally released from the brake pipe at one rate for causing a quick service reduction in brake pipe pressure, and a normally closed release communication including said passage via which fluid under pressure may be locally released from the selector volume at a faster rate; a movable abutment reciprocable within said casing means and subject opposingly to brake pipe pressure and selector volume pressure; and a pair of valves reciprocable in said casing means forming part of and controlling said communications, one of said valves being positively connected to said movable abutment and the other of said valves having a lost motion connection with said one valve so as to be movable by and also relative to said one valve, said movable abutment being responsive to a reduction in brake pipe pressure below selector volume pressure to shift said one valve and thereby said other valve initially in unison for successively causing said one valve to open said quick service communication and then carry said other valve in one direction past said passage for causing said other valve to be shifted by selector volume pressure in said passage to one limit of its lost motion relative to said one valve for opening said release communication, said movable abutment thereafter being responsive to a consequent reduction in selector volume pressure to substantially the existing value of brake pipe pressure to shift said one valve and thereby said other valve initially in unison for successively causing said one valve to close said quick service communication and then carry said other valve in the opposite direction past said passage for causing said other valve to be shifted by selector volume pressure in said passage to the other limit of its lost motion relative to said one valve for closing said release communication, whereby the quick service communication will be opened before the release communication is opened and will be closed before said release communication is closed.

8. The combination according to claim 7, including a normally open restricted charging communication via which the selector volume is charged from the brake pipe, a normally vented quick service volume, a brake cylinder, and valve means operative to cut off the quick service volume from a vent when brake cylinder pressure exceeds a chosen low value, and wherein said movable abutment responds to a reduction in brake pipe pressure below selector volume pressure to cause said one valve to close said charging communication and connect the brake pipe to said quick service volume before said quick service communication and release communication are successively opened, such that brake pipe pressure will be locally reduced by equalization into said quick service volume and also flow through said quick service communication during an initial reduction in brake pipe pressure, and brake pipe pressure will be locally reduced solely by way of said quick service communication during subsequent further reductions in brake pipe pressure.

9. In a fluid pressure brake apparatus, the combination of a brake pipe; a selector volume chargeable with fluid under pressure at a restricted rate from the brake pipe; casing means providing a bore along which are axially spaced the mouths of one restricted vent port via which fluid under pressure may be locally released from the brake pipe at one rate for causing a quick service reduction in brake pipe pressure, another restricted vent port via which fluid under pressure may be released from the selector volume at a faster rate, a third restricted vent port, and a passage leading to the selector volume and opening through the wall of said bore at a point therealong intermediate said other and third vent ports, a cylindrical slide valve sealingly slidable in said bore and having a plurality of elongated annular cavities, a ring valve carried in one of said cavities for movement by and relative to said slide valve within limits defined by contact with the ends of said one cavity, said ring valve being subject to selector volume pressure and to pressure of fluid in said other vent port or said third vent port according to whether said ring valve is at one side or the other side of said passage; and a movable abutment positively connected to said slide valve and subject opposingly to brake pipe pressure and selector volume pressure, said movable abutment being responsive to a reduction in brake pipe pressure below selector volume pressure to shift said slide valve and thereby said ring valve in unison in one direction for successively causing said slide valve to connect the brake pipe to said one vent port and then carry said ring valve to said other side of said passage for thereby causing said ring valve to be blown by pressure in said passage in said one direction relative to said slide valve and thereby effectively uncover said passage to said other vent port, said movable abutment being responsive to a consequent reduction in selector volume pressure to substantially the existing value of brake pipe pressure to shift said slide valve and thereby said ring valve in unison in the opposite direction for causing said slide valve to successively cut off the brake pipe from said one vent port and then carry said ring valve to said one side of said passage for thereby causing said ring valve to be blown by pressure in said passage in said opposite direction relative to said slide valve and thereby effectively cut-off said passage from said other vent port, whereby the brake pipe will be connected to and disconnected from said one vent port before the passage and hence the selector volume is connected and disconnected from said other vent port.

10. In a fluid pressure brake apparatus, the combination of a normally charged brake pipe, a normally charged volume, valve means controlling a plurality of separate flow communications of different flow capacities and subject opposingly to brake pipe pressure and volume pressure, said valve means having a normal position in which it permits pressure fluid to flow from the brake pipe to the volume at a restricted rate via a first one of said communications, said valve means being operatively responsive to a reduction in brake pipe pressure at a service rate and in excess of a chosen degree below volume pressure to a service position in which said first communication is closed and pressure fluid is released from the brake pipe at a relatively slow rate via another of said communications and pressure fluid is released from the volume at a faster rate via a different one of said communications, and responsive to an emergency rate of reduction in brake pipe pressure relative to volume pressure to an emergency position in which said first communication and different communication are closed and pressure fluid is bottled up in said volume at substantially the pressure existing in the brake pipe at the time said emergency rate of reduction in brake pipe pressure was initiated, whereby upon a subsequent increase in brake pipe pressure movement of said valve means from emergency position toward normal position will be deferred until brake pipe pressure is restored to within a chosen degree of the pressure existing in the volume.

11. The combination according to claim 10, wherein said plurality of separate flow communications includes a normally closed preliminary quick service communication via which pressure fluid may be released from the brake pipe in bypass of said other communication, and wherein said valve means upon a slight degree of reduction in brake pipe pressure below volume pressure, less than said chosen degree, is operative to a preliminary quick service position in which said preliminary quick service communication is opened but said first communication and other communication and different communication are closed, whereby with said valve means in preliminary quick service position brake pipe pressure will be locally reduced to assist movement of said valve means to service position.

12. A fluid pressure brake apparatus comprising, in combination, a brake pipe, a control reservoir, a selector volume, a first one-way charging communication via which fluid under pressure may normally flow from the brake pipe to the control reservoir, a second charging communication via which fluid under pressure may normally flow from the brake pipe to said selector volume independently of said first one-way charging communication, two release communications of different flow capacities, a third release communication, valve means subject opposingly to brake pipe pressure and selector volume pressure controlling flow through said second charging communication and said two release communications and responsive to an initial reduction in brake pipe pressure at a service rate below selector volume pressure to close said second charging communication and effect a local quick service release of fluid under pressure from said brake pipe to said third release communication, said valve means being responsive to further reduction in brake pipe pressure at a service rate below said initial reduction to effect release of fluid under pressure from said brake pipe simultaneously to that one of said two release communications having the smaller flow capacity and to said third release communication, and to also release fluid under pressure from said selector volume at a faster rate via the other of said two release communications until selector volume pressure has been reduced to substantially the existing value of brake pipe pressure, service valve means for controlling the degree of application and release of brakes according to the extent of reduction and restoration, respectively, in brake pipe pressure relative to control reservoir pressure, and a one-way flow communication including an operator-adjustable release selector means adjustable alternatively to a direct release position to, in cooperation with said valve means when subject opposingly to equal brake pipe pressure and selector volume pressure, establish a communication through which fluid under pressure may flow from said control reservoir to said selector volume at a restricted rate and to said brake pipe at a substantially unrestricted rate in bypass of said first one-way charging communication, or to a graduated release position for closing said communication whereby, when said valve means is subject opposingly to equal brake pipe pressure and selector volume pressure, fluid under pressure may flow from said control reservoir at a restricted rate to only said selector volume, for thereby causing said service valve means to operate to correspondingly provide either a complete direct release of brakes or a graduated release of brakes.

13. A fluid pressure brake apparatus comprising, in combination, a normally charged brake pipe, a control reservoir, a selector volume of smaller capacity than said control reservoir, a quick service volume normally having a restricted connection with the atmosphere, a normally closed continuous quick service communication via which fluid under pressure may be locally released from the brake pipe to atmosphere at one rate concurrently with release to said quick service volume, a normally closed release communication via which fluid under pressure may be locally released from the selector volume to atmosphere at a rate faster than said one rate, a first one-way charging communication via which fluid under pressure may normally flow from the brake pipe to the control reservoir, a branch of said one-way charging communication via which fluid under pressure may flow to said selector volume at a restricted rate, a first normally open charging communication via which fluid under pressure may flow from said brake pipe at a restricted rate to both said control reservoir and to said selector volume, first valve means subject opposingly to brake pipe pressure and selector volume pressure controlling flow through said first normally open charging communication and said branch communication and to said quick service volume and said normally closed continuous quick service communication, said valve means being responsive to an initial reduction in brake pipe pressure at a service rate below selector volume pressure to first move to one position for closing said first normally open charging communication and branch communication, and opening said brake pipe to said quick service volume, and then to move to a service position for opening said brake pipe to said continuous quick service communication in addition to said quick service volume and said normally closed release communication to atmosphere to also release fluid under pressure from said selector volume to atmosphere at a faster rate until selector volume pressure has been reduced to substantially the existing value of brake pipe pressure to effect return of said first valve means from its service position to its said one position for thereby conditioning said first valve means to repeatedly open said brake pipe to said continuous quick service communication upon successive reduction in brake pipe pressure at a service rate following said initial reduction, said first valve means being responsive to an increase in brake pipe pressure above selector volume pressure to move to a normal position to reopen said branch communication to release fluid under pressure from control reservoir into said selector volume at a restricted rate less than the rate of increase in brake pipe pressure and to reopen said first charging communication to effect charging said control reservoir and said selector volume from said brake pipe subsequent to equalization of pressure in said control reservoir and said selector volume and an increase in brake pipe pressure above said equalization pressure, a brake cylinder, service valve means operative to provide in said brake cylinder fluid at a pressure substantially proportional to the magnitude of the differential in pressure between control reservoir pressure and brake pipe pressure, other valve means arranged in said first charging communication between said brake pipe and first valve means and operable by brake cylinder pressure in response to brake cylinder pressure exceeding a preselected low value to close said first charging communication and the restricted connection of said quick service volume to atmosphere to maintain said first charging communication closed notwithstanding return of said first valve means to its said one position until brake cylinder pressure is reduced below said preselected value, and a one-way flow communication including an operator-adjustable release selector means adjustable alternatively to a direct release position to, in cooperation with said first valve means when subject opposingly to equal brake pipe pressure and selector volume pressure, establish a communication through which fluid under pressure may flow from said control reservoir to said brake pipe at a substantially unrestricted rate in bypass of said first one-way charging communication, or to a graduated release position for closing said communication, for thereby causing said service valve means to operate to correspondingly provide either a complete direct release of brakes or a graduated release of brakes.

14. The combination according to claim 13, wherein said first valve means responds to an emergency rate of reduction in brake pipe pressure relative to selector volume pressure to move to an emergency position for closing said release communication for thereby bottling up fluid in the selector volume at a pressure corresponding substantially to the value of brake pipe pressure at the time said emergency rate of brake pipe pressure reduction was initiated, such that return movement of said first valve means to its normal position will be deferred until brake pipe pressure has been increased to a value exceeding the pressure bottled up in said selector volume.

15. The combination according to claim 13, including a first relatively weak caged spring and a stronger caged spring effectively engaged by said first valve means after a predetermined movement and predetermined greater movement thereof, and wherein said first valve means is moved to its said one position solely by the differential between selector volume pressure and brake pipe pressure and is moved to its service position against resistance of said first caged spring without effecting compression of said stronger caged spring, and is moved to its said emergency position against resistance of both of said caged springs.

References Cited in the file of this patent

UNITED STATES PATENTS

| | | |
|---|---|---|
| 555,196 | Wenger | Feb. 25, 1896 |
| 893,307 | Cloud | July 14, 1908 |
| 1,913,997 | Seifferle | June 13, 1933 |